(12) United States Patent
Oliver et al.

(10) Patent No.: US 7,589,456 B2
(45) Date of Patent: Sep. 15, 2009

(54) DIGITAL CAPACITIVE MEMBRANE TRANSDUCER

(75) Inventors: Nelson H. Oliver, Sunnyvale, CA (US); Worth B. Walters, Cupetino, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 681 days.

(21) Appl. No.: 11/152,632

(22) Filed: Jun. 14, 2005

(65) Prior Publication Data
US 2006/0279174 A1 Dec. 14, 2006

(51) Int. Cl.
*H01L 41/08* (2006.01)
(52) U.S. Cl. .................................. 310/338
(58) Field of Classification Search ........... 310/334, 310/337, 332, 326, 338, 309, 311; 600/459; 367/163, 174; 381/174; *H01L 1/00*
See application file for complete search history.

(56) References Cited

U.S. PATENT DOCUMENTS

| | | | |
|---|---|---|---|
| 4,699,009 A * | 10/1987 | Maslak et al. | 73/626 |
| 6,320,239 B1 * | 11/2001 | Eccardt et al. | 257/415 |
| 6,745,632 B1 | 6/2004 | Dryer et al. | |
| 6,783,493 B2 | 8/2004 | Chiang et al. | |
| 6,790,182 B2 | 9/2004 | Eck et al. | |
| 6,829,131 B1 | 12/2004 | Loeb et al. | |
| 2005/0075572 A1 * | 4/2005 | Mills et al. | 600/459 |

* cited by examiner

*Primary Examiner*—Quyen Leung
*Assistant Examiner*—Karen B Addison

(57) ABSTRACT

A capacitive membrane is used as a digital sensor. Membranes act as binary devices, such as being in a collapsed or non-collapsed state. By providing drum heads (membranes and associated gaps) with different response characteristics, the drum heads of an element digitally indicate the amplitude of the acoustic force by which of the drum heads are triggered or change states. The digital transducer may be used for different types of sensors, such as a CMUT, an air pressure, a temperature, a humidity, a chemical or biological stimulus or other sensor.

18 Claims, 1 Drawing Sheet

DIGITAL CAPACITIVE MEMBRANE TRANSDUCER

BACKGROUND

This present description relates to capacitive membrane transducers. For example, capacitive membrane ultrasound transducers (CMUT) are provided.

CMUTs provide a greater bandwidth than piezoelectric-ceramic transducers. An array of elements, such as a two-dimensional array of elements is formed using microelectromechanical processes. Each element includes a plurality of membranes with associated electrodes separated by a gap or void, which transduce between electrical and acoustic energy. Flexing of the membranes in response to acoustic energy generates an analog electrical signal representing the amount of flexing. However, CMUTs typically have a large impedance mismatch with the receive beamformer electronics due to the low reactance of the CMUT. Receiving an analog signal with a desired dynamic range may use complex, expensive, or large circuits to interface between the CMUT and the receive beamformer. The interface electronics may also require co-location with the CMUT elements, adding to the size, weight, and heat load of the transducer head.

BRIEF SUMMARY

By way of introduction, the preferred embodiments described below include methods, systems and sensors for a digital capacitive membrane transducer. The capacitive membrane is used as a digital sensor. For example, the membranes are binary devices, such as being in a collapsed or non-collapsed state. By providing drum heads (membranes and associated gaps) with different response characteristics, the drum heads of an element digitally indicate an amplitude of the acoustic energy by which of the drum heads are triggered or change binary states. The digital transducer may be used for different types of sensors, such as a CMUT, an air pressure, a temperature, a humidity, a biological stimulus or other sensor.

In a first aspect, a method is provided for receiving acoustic energy with a capacitive membrane ultrasound transducer. A first membrane operates as a first binary acoustic sensor. An output of a first element of the capacitive membrane ultrasound transducer is determined as a function of the first binary acoustic sensor.

In a second aspect, a system is provided for receiving ultrasound energy. A first element has a plurality of acoustic drum heads. At least two of the acoustic drum heads have different acoustic response characteristics. An encoder connects with the first element. The encoder outputs digital information as a function of collapse, snap-back or both collapse and snap-back operation of the acoustic drum heads.

In a third aspect, a sensor is provided for detecting a characteristic. A plurality of capacitive membrane transducers has hysteretic bistable states. An encoder measures the characteristic as a function of outputs of the capacitive membrane transducers.

In a fourth aspect, a method is provided for receiving acoustic energy with a capacitive membrane ultrasound transducer. A first membrane operates as an acoustic sensor with more than two digital states. For example, the collapsed state may be differentiated into several discrete steps, via separate electrodes. Any of several output levels of a first element of the capacitive membrane ultrasound transducer are determined as a function of the first acoustic sensor.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Different membranes each operate in a collapse and snap-back mode in response to different influences. One or more bits of information are provided from each of the different membranes. For a CMUT, each element includes the different membranes. The membranes collapse or snap back at different acoustic pressures. The different membranes are responsive to different pressures or rarefactions within a desired range, such as about 30 dB of dynamic range. By determining which membranes collapse or snap-back, the pressure or rarefaction is measured using binary or other digital sensors. Since no analog signal is processed, the receive signals output for an element may be less susceptible to noise, possibly allowing transmission to a remote receive beamformer without amplification.

Figure 1:
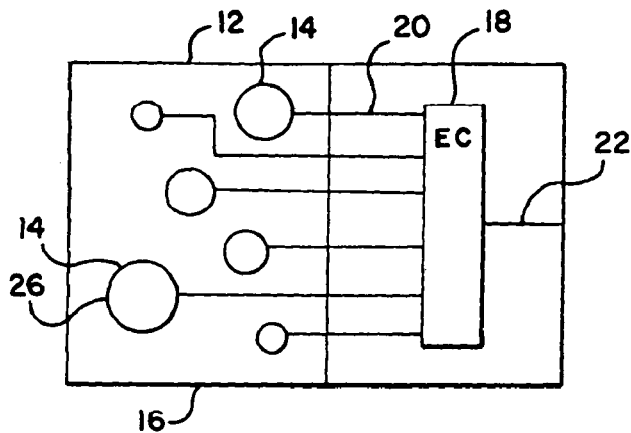
FIG. 1 is a block diagram representation of one embodiment of a sensor.

FIG. 1 shows a system for receiving a signal, such as ultrasound energy. The system includes a substrate 12, one or more membranes 14, a sensor section 16, an encoder 18, electrical connections 20 and an output 22. Additional, different or fewer components may be provided. In one embodiment, the system is part of a CMUT where the sensor section 16 is an element of an array. The system is a different type of sensor in other embodiments.

Figure 2:
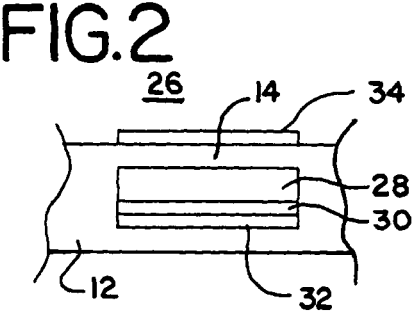
FIG. 2 is a cross-sectional view of one embodiment of membrane transducer in an non-collapsed state.
Figure 3:
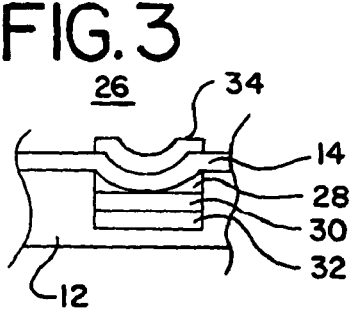
FIG. 3 is a cross-sectional view of the membrane transducer of FIG. 2 in a collapsed state.

The membranes 14 are part of drum heads 26, such as acoustic drum heads 26 for a CMUT. FIGS. 2 and 3 show example embodiments of an acoustic drum head 26. The acoustic drum head 26 includes the membrane 14 positioned over an air, gas, vacuum, or liquid filled gap 28. The gap 28 is thin, such as about 0.2 to 0.005 micrometers. Thicker or thinner gaps 28 may be provided. The membrane 14 is thin, such as about 1 to 0.01 micrometers, but thicker or thinner membranes 14 may be used. A pair of electrodes 32, 34 is provided on different sides of the gap 28, such as one electrode 32 in a bottom of the gap 28 and another electrode 34 on a top of the membrane 14. Different electrode positions may be used. An insulator 30 is provided within the gap 28, such as on the electrode 32 as shown, on the membrane 14 or both. Additional, different or fewer components may be provided, such as the drum head 26 being free of the insulator 30, or being made of electrically conducting material that acts as a common ground.

The drum heads 26 are formed using microelectromechanical processes, such as semiconductor manufacturing processes. Using CMOS, deposition, sputtering, patterning, etching or other techniques, the various components are formed, including electrical connections 20, on or in the substrate 12. The substrate 12 is a semiconductor, such as silicon, or other now known or later developed material for forming the drum head 26.

The insulator 30 is a semiconductor insulator, such as silicon oxide. Alternatively, the insulator 30 is a high-permittivity insulator, such as titanate or sapphire based insulators. High-permittivity or high-dielectric insulators may have a piezoelectric property, such as converting pressure caused by collapse of the membrane 14 as shown in FIG. 3 into electrical energy. The electrical energy is used with the capacitive effects of collapse to more readily detect the collapse. The insulator 30 is thin, such as about 50 nm, but thicker or thinner insulators 30 may be used. In one embodiment, the insulator 30 has a thickness of 0.4 micrometers and a relative dielectric constant of about 10. If the relative permittivity is higher, such as 100, the insulator thickness may be larger and still yield the same or similar receive sensitivity, which may be desirable depending on the voltages of operation.

Referring to FIG. 1, the sensor section 16 (e.g., an element of a CMUT) includes a plurality of membranes 14 and associated drum heads 26. For example, at least fifty, one hundred, two hundred and fifty six or other number of membranes 14 and associated drum heads 26 are provided for a single acoustic element. The membranes 14 are distributed in any desired pattern. In alternative embodiments, a single membrane 14 is provided.

The drum heads 26 have different response characteristics, such as different ones or groups of the drum heads 26 responding differently to different acoustic amplitudes, pressures or powers. Different response characteristics are provided by different diameters, membrane thicknesses, gap depths or combinations thereof. In one embodiment, the diameter or lateral extent of the gap 28 and associated membrane 14 vary to provide different response characteristics. The thickness is substantially uniformly thin or also varies. Similarly, the gap depth is substantially uniformly thin or also varies. For example, one or more drum heads 26 have a vacuum gap 28 of 0.01 micrometers, a membrane thickness of 0.2 micrometers and a membrane radius of about 15 micrometers. One or more other drum heads 26 have a different membrane radius, such as 15.2 micrometers. The difference in membrane radius or other characteristic results in different operation.

A drum head may make reversible contact with more than one electrode in the course of collapse and snap-back. In one embodiment, the floor of the gap contains multiple electrodes, such as in the form of concentric rings, which yield a multi-bit stepwise response to varying acoustic pressure and/or rarefaction, as the number of electrodes contacted by the membrane changes.

Different response characteristics are provided additionally or alternatively by operating some drum heads 26 in a normally open mode and others in a normally closed (collapsed) mode. The drum heads 26 are biased without application of the sensed energy in one of the binary states. FIG. 2 shows the drum head 26 for a normally open mode where acoustic pressure causes the membrane 14 to collapse in the gap 28. Positive pressure is sensed by collapsing the membrane 14. The lessening or release of positive pressure is sensed by the membrane 14 returning or snapping back to a position above the gap 28. FIG. 3 shows the drum head 26 for a normally collapsed mode where acoustic rarefaction or suction causes the membrane 14 to extend from the bottom of the gap 28. The lessening or release of suction causes the membrane 14 to snap back to a collapsed position.

The drum heads 26 collapse and snap back at different voltages, pressures or other signal inputs. In one embodiment, the collapse and snap-back have a hysteretic character. For example, collapse of one or more membranes 14 occurs at 10 volts or −15 dB acoustic pressure level and snap-back occurs at 8 volts or −20 dB. Other absolute or relative values may be used, such as where different membranes 14 or drum heads 26 have different characteristics. The hysteresis may be made larger or smaller, such as approaching zero through the use of small gaps and low voltage. By using lower voltage operation, the amount of acoustic pressure or other outside power required to modulate between the collapses and normal deflected or snap-back states may be lessened. The hysteretic bistable state is based on exposure to chemical species in gaseous state, liquid state, solid state, plasma state or combinations thereof.

The bias voltage applied to the membranes 14 may affect the hysteresis. Different bias voltages at different times and/or to different membranes 14 are used to alter the hysteretic or response characteristic of the drum heads 26. Varying the bias voltage may provide for a greater resolution within a given dynamic range. For example, a given membrane 14 is operated to trigger or alter states at different powers. In an acoustic example, intermediate collapse pressures are provided by ramping or changing the bias voltage over the course of several transmit cycles. The variation alters the collapse and/or snap-back voltages, tuning the collapse and snap-back pressures slightly. By receiving in response to different transmit pulses with different bias voltages, a same drum head 26 triggers or detects different acoustic energy levels. Voltage ramping alone may be used without variation in the response characteristic of the drum heads 26. However, at higher voltages, the collapse-snapback hysteresis widens, allowing less data to be recorded.

Figure 4:
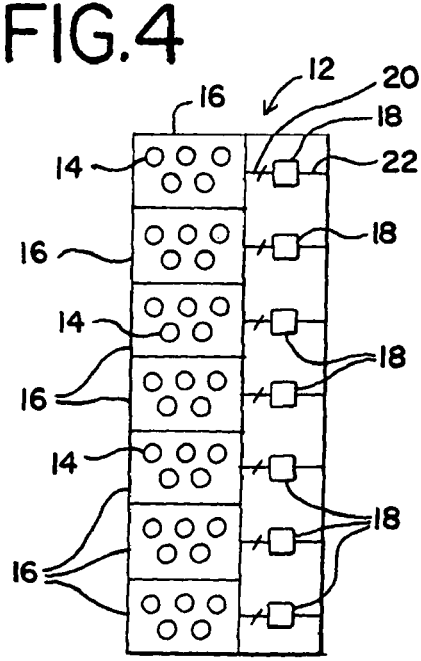
FIG. 4 is a block diagram representation of one embodiment of a CMUT.

The encoder 18 connects with the element 16. The connections are electrical connections. Separate electrical connections 20 are provided for each of the drum heads 26, but one or more drum heads 26 may share an electrical connection with the encoder 18. A single encoder 18 is provided for each element 16 as shown in FIG. 4. Alternatively, multiple encoders 18 are provided for each element 16 or the drum heads 26 of multiple elements 16 connect with a same encoder 18.

The encoder 18 and drum heads 26 are on a common substrate 12. The electrical connections 20 may be smaller or formed as part of an integrated circuit on the common substrate 12. Given the digital or binary operation of the drum heads 26 and detection of the state of the drum heads 26, an amplifier between the drum heads 26 and the encoder or between the drum heads 26 and any receive beamforming circuitry may be avoided. For example, the common substrate 12 with the element 16 and the encoder 18 are free of an amplifier. Alternatively, the encoder 18 and drum heads 16 are on separate substrates.

The encoder 18 is a processor, digital signal processor, application specific integrated circuit, field programmable gate array, analog circuit, digital circuit, integrated circuit, combinations thereof or other now known or later developed circuit. In one embodiment, the encoder 18 contains an impedance analyzer, such as a voltage or current detector.

The encoder 18 outputs digital information as a function of collapse, snap-back or both collapse and snap-back operation of the acoustic drum heads 26. The encoder 18 operates with or includes a clock or clock signal, such as a clock and signal shared by all or multiple encoders 18. The encoder 18 measures a state of each of the drum heads 26 periodically, such as every millisecond. By determining which drum heads 26 have or have not altered states at a give time, the encoder 18 determines the force applied to the element 16. For example, one half of the drum heads 26 operate in a normally closed mode and do not alter state in response to positive pressure. The other half of the drum heads 26 operate in a normally open mode. The positive pressure is sufficient to collapse some or all of the drum heads 26. As the positive pressure increases or decreases, different numbers or ones of the drum heads 26 change state. The encoder 18 measures a current positive pressure by determining which of the normally closed drum heads 26 have opened, and which of the normally open ones have closed. The measurement and associated time of measurement are output as digital information. Over time, the outputs represent the detected pressure as a function of time. Where the received signal varies over time, such as in periodic ultrasound signals, the different amplitude time-steps digitally represent the analog force applied to the element 16.

The encoder 18 or a receive beamformer reassembles or uses the measured values to determine samples representing scanned locations at different times. Frequency or time domain analysis may be used. The different amplitude steps are assembled at their respective delays into a quasi-analog response in the frequency domain, or the bit streams are processed in the time domain via their autocorrelation functions. The autocorrelation function is defined as the autocovariance divided by the variance, and, for a time sequence, represents the time required for a signal to become random, i.e., uncorrelated. The time autocorrelation function is the time-frequency transform of the spectral density function, containing the same information as the power spectrum. The time autocorrelation function best suited for acoustic analysis is a scaled type, in which multiple states or degrees of correlation are detected at each time interval, but clipped or other functions may be used.

The output digital information is a first signal representing received power, such as acoustic power, for the entire element 16. The binary readings (e.g., collapsed or not collapsed) of the drum heads 26 is digital. The signal representing the received power is digital. The output digital information is a value representing an acoustic pressure or other power as a function of binary readings from the plurality of acoustic drum heads 26. The encoder 18 and element 16 operate as a digital sensor, such as digital CMUT, reducing susceptibility to noise and decreasing the necessity for power-consuming and heat-generating amplifiers.

FIG. 4 shows an array of elements 16 and associated encoders 18. For example, the array of elements 16 acts as an ultrasound transducer array for receiving acoustic echoes. Any number of elements 16 may be used, such as 128, 192, or 256. The array is linear, curved, one dimensional, multi-dimensional (e.g., 1.5 D) or two dimensional. Each element 16 includes a plurality of drum heads 26 for receiving energy. The encoders 18 measure the amplitude of received pressure at different times by counting the numbers of open and collapsed drum heads. A receive beamformer connects with the encoders 18, such as on the common substrate 12, on a different substrate and/or through one or more cables. The trace or electrical connection 22 (see FIG. 1) outputs the measurements for beamforming.

Figure 5:
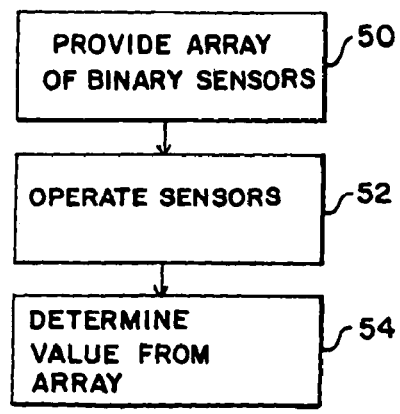
FIG. 5 is a flow chart diagram of one embodiment of a method for sensing a characteristic with a digital sensor.

FIG. 5 shows a method for receiving acoustic or other energy with a capacitive membrane ultrasound or other transducer. The method may include additional, different or fewer acts, such as including a transmit act. The acts are performed in the order shown or a different order.

In act 50, an array of digital sensors, such as binary or three state sensors, is provided. Alternatively, a single digital sensor, such as single drum head 26 or an element 16 with a plurality of drum heads 26, is provided. The digital sensors are the sensors described above for FIGS. 1, 2, 3 and/or 4, or other now known or later developed digital sensors.

In act 52, the sensors are operated. Membranes of the different sensors, such as a binary acoustic sensor, are operated automatically in response to applied power, such as acoustic energy or pressure. By operating the sensors as digital in function, such as collapsed and non-collapsed states, analog signals showing variation in membrane position are avoided. By using sensors with different response characteristics, such as membranes with different diameters, the sensors alter states in response to different applied pressures.

The membranes operate in a normally closed or collapsed state, a normally open state, or both. For example, a first set of the digital state sensors (e.g., membranes) operate in a normally open mode. The membrane is normally not collapsed, so a change in the binary state is detected in response to membrane collapse triggered by applied pressure. A second set of the state sensors operate in a normally closed mode. The membrane is normally in a collapsed position, so a change in the binary state is detected in response to membrane snap-back or movement to a non-collapsed state, which is triggered by applied rarefaction. The transition back to a normal state may also be detected. Where the transitions away from normal and back to the normal state are associated with different voltages, capacitances, or powers, the binary state sensors are hysteretic bistable devices. Other sensors may incorporate detection of multiple collapsed states, corresponding to different applied levels of pressure or rarefaction, in which only the lowest-force step, between the open and collapsed states, displays hysteresis.

In act 54, values are determined from the sensors, such as from an array of sensors. For an acoustic example, an output of each element of the capacitive membrane ultrasound transducer is determined as a function of the digital acoustic sensors. An output is provided for each element in the acoustic array. Each element may include one or a plurality of digital sensors. By measuring the state or membrane position of all of the sensors that comprise one element, the acoustic amplitude is determined.

As an alternative or in addition to measuring an amplitude with the digital sensors, a time of a change in a state of the digital acoustic sensor is measured. The change indicates a pressure or energy associated with the change of the sensor. More simply, the sensor may be used as a detector for a threshold for sufficient pressure. The time of triggering or alteration indicates the existence of an echo. The time is used without an indication of amplitude for generating an image or detecting an event of interest. For example, a dielectric insulator layer such as a ferroelectric oxide located between the membrane and the cavity floor may be used to generate a voltage pulse at the instant of collapse or snapback, transducing the mechanical energy of membrane motion into a voltage spike that is readily detectable and localizable in time.

The binary state sensors are provided for detecting a characteristic. A plurality of capacitive membrane transducers have hysteretic bistable states, providing for sensing two different values of a characteristic with a same sensor. By distributing a plurality of capacitive membrane transducers in multiple elements, the characteristic is sensed as a function of location.

The capacitive membrane transducers or other sensor structures are operable as binary sensors. The sensors change state as a function of the magnitude of the characteristic. Different ones of the capacitive membrane transducers respond to different magnitudes of the characteristic.

The capacitive membrane transducers or other sensor structures are operable as multistep digital sensors. The sensor changes state as a function of the magnitude of the characteristic, with more than two separate states detected through a multiplicity of electrodes, each of which yields a large, nonlinear change in impedance as the membrane connects to or disconnects from it. Different electrodes within the capacitive membrane transducer respond to different magnitudes of the characteristic.

Any one or more of many different characteristics may be sensed. For example, the hysteretic bistable states are responsive to ultrasound, temperature, air pressure, biological stimulus, or humidity. For temperature, the membranes, beams or other structures of the binary sensors are temperature sensitive. Bi-layer metals or other materials respond to temperature. For humidity, organic materials may be used in the sensor for reacting to humidity. Different holes in membranes, other structures or different materials allow for different response of different ones of the binary sensors. Different materials used for different binary sensors vary the response characteristic to biological stimulus.

An encoder measures the characteristic as a function of outputs of the capacitive membrane transducers or binary state sensors. Separately measurements are provided for each of multiple elements for scanning or steering. Alternatively, multiple elements are provided for redundancy. Single element sensors may also be used.

While the invention has been described above by reference to various embodiments, it should be understood that many changes and modifications could be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for receiving an acoustic signal with a capacitive membrane ultrasound transducer, the method comprising:
    operating a first membrane as a first digital acoustic sensor such that an altered state of the membrane is detected by sampling, different states of the membrane corresponding to different discrete positions; and
    determining an output of a first element of the capacitive membrane ultrasound transducer as a function of the first digital acoustic sensor.

2. The method of claim 1 wherein operating comprises operating the first membrane and a plurality of additional membranes as digital acoustic sensors, including the first digital acoustic sensor, the first membrane and the plurality of additional membranes having different diameters, and wherein determining comprises determining the output as a function of the digital acoustic sensors of the first membrane and the plurality of additional membranes.

3. The method of claim 1 further comprising:
    operating a second membrane as a second digital acoustic sensor; and
    determining an output of a second element of the capacitive membrane ultrasound transducer as a function of the second digital acoustic sensor.

4. The method of claim 1 wherein determining the output is performed without prior amplification of signals from the first digital acoustic sensor.

5. The method of claim 1 wherein operating comprises operating the first membrane as a hysteretic bistable device.

6. The method of claim 1 wherein operating comprises operating the first membrane in a normally closed, normally open, or both normally closed and open states.

7. The method of claim 2 wherein determining the output comprises determining an acoustic amplitude as a function of binary, ternary, or other states of the digital acoustic sensors.

8. The method of claim 1 wherein determining the output comprises determining a change in the state of the first digital acoustic sensor as a function of time.

9. The method of claim 2 wherein operating comprises operating a first set of the digital state sensors in a collapsed mode and operating a second set of the binary state sensors in a normally open mode, the collapsed mode corresponding to changing a binary state in response to membrane opening, and the open mode corresponding to changing the binary state in response to membrane collapse.

10. A sensor for detecting a characteristic, the sensor comprising:
    a plurality of capacitive membrane transducers having hysteretic bistable states; and
    an encoder operable to measure the characteristic as a function of outputs of the capacitive membrane transducers.

11. The sensor of claim 10 wherein the hysteretic bistable states are responsive to ultrasound, temperature, air pressure, biological stimulus, or humidity.

12. The sensor of claim 10 wherein the hysteretic bistable states are responsive to exposure to chemical species in a gaseous state, a liquid state, a solid state, a plasma state, or combinations thereof.

13. The sensor of claim 10 wherein the capacitive membrane transducers are operable as binary, ternary, or other digital sensors as a function of the characteristic, different ones of the capacitive membrane transducers responsive to different magnitudes of the characteristic.

14. The sensor of claim 10 wherein the plurality of capacitive membrane transducers are distributed in at least two elements, the encoder being operable to measure separately for each of the at least two elements.

15. The sensor of claim 10 wherein the hysteretic bistable states are in a collapsed state and a non-collapsed state.

16. The sensor of claim 15 wherein a first of the capacitive membrane transducers is biased to a collapsed state and a second of the capacitive membrane transducers is biased to a non-collapsed state.

17. A method for receiving acoustic energy with a capacitive membrane ultrasound transducer, the method comprising:
    operating a membrane as an acoustic sensor with more than two digital states with a multi-bit stepwise response; and
    determining one of several output levels of an element of the capacitive membrane ultrasound transducer as a function of the acoustic sensor.

18. The method of claim 17 wherein operating comprises detecting a plurality of different digital states during collapse of the membrane.

* * * * *